(12) United States Patent
Heller

(10) Patent No.: US 11,336,728 B2
(45) Date of Patent: May 17, 2022

(54) SYSTEM AND METHOD FOR ENABLING ACCESS TO RESOURCES

(71) Applicant: GOOD2GO, INC., San Francisco, CA (US)

(72) Inventor: Frances Heller, San Francisco, CA (US)

(73) Assignee: GOOD2GO, INC., San Francisco, CA (US)

( * ) Notice: Subject to any disclaimer, the term of this patent is extended or adjusted under 35 U.S.C. 154(b) by 0 days.

(21) Appl. No.: 17/091,224

(22) Filed: Nov. 6, 2020

(65) Prior Publication Data

US 2021/0058463 A1 Feb. 25, 2021

Related U.S. Application Data

(63) Continuation of application No. 16/423,655, filed on May 28, 2019, now Pat. No. 10,944,828.

(60) Provisional application No. 62/685,389, filed on Jun. 15, 2018.

(51) Int. Cl.
| | |
|---|---|
| G06F 15/173 | (2006.01) |
| H04L 67/12 | (2022.01) |
| H04L 67/52 | (2022.01) |
| H04L 43/08 | (2022.01) |
| H04L 67/1001 | (2022.01) |
| G06F 15/16 | (2006.01) |

(52) U.S. Cl.
CPC .............. *H04L 67/12* (2013.01); *H04L 43/08* (2013.01); *H04L 67/1002* (2013.01); *H04L 67/18* (2013.01)

(58) Field of Classification Search
CPC ......... H04L 67/12; H04L 67/18; H04L 43/08; H04L 67/1002
USPC ........................................................ 709/224
See application file for complete search history.

(56) References Cited

U.S. PATENT DOCUMENTS

| | | | | |
|---|---|---|---|---|
| 7,535,367 B2* | 5/2009 | Ratnakar | ................ | G06Q 10/02 340/573.1 |
| 2006/0186268 A1* | 8/2006 | Harrington | ........ | B64D 11/0007 244/118.5 |
| 2007/0241927 A1* | 10/2007 | Ratnakar | ................ | G06Q 10/02 340/4.6 |
| 2009/0112377 A1* | 4/2009 | Schalla | .............. | B64D 11/0015 701/3 |
| 2014/0244207 A1* | 8/2014 | Hicks | ....................... | G01C 3/00 702/150 |
| 2017/0283086 A1* | 10/2017 | Garing | ............... | B64D 45/0005 |
| 2018/0265216 A1* | 9/2018 | Breigenzer | ........... | B64C 1/1469 |

(Continued)

*Primary Examiner* — Karen C Tang
(74) *Attorney, Agent, or Firm* — Ulmer & Berne LLP

(57) ABSTRACT

A system for enabling access to resources in a setting so that a number of requesters can efficiently access limited resources. The system may be implemented as a custom set of devices integrated in a setting, or may be retrofitted into existing equipment in some settings. A user interface is available to each potential requester that can be used to submit a request to access a resource. A server is configured to receive requests and use a variety of information to manage those requests and provide a notification via the user interfaces of when and where a user should proceed to in order to access a resource. The server also implements one or more techniques or procedures for managing the flow of traffic through the setting and to the resources to ease congestion and improve flow and access.

16 Claims, 16 Drawing Sheets

(56) References Cited

U.S. PATENT DOCUMENTS

| | | | |
|---|---|---|---|
| 2018/0281673 A1* | 10/2018 | Garing | B64D 11/00 |
| 2018/0285785 A1* | 10/2018 | Smith | B64D 11/00155 |
| 2019/0042175 A1* | 2/2019 | Shah | G06F 3/147 |
| 2019/0112050 A1* | 4/2019 | Ibrahim | G06N 20/00 |
| 2019/0265868 A1* | 8/2019 | Penilla | G07C 5/008 |

* cited by examiner

SYSTEM AND METHOD FOR ENABLING ACCESS TO RESOURCES

PRIORITY

This application claims priority to U.S. Non-Provisional patent application 16/423,655, filed May 28, 2019, and titled "System and Method for Enabling Access to Resources", which claims priority to U.S. Provisional patent application 62/685,389, filed Jun. 15, 2018, and titled "System and Method for Enabling Access to Resources", the disclosure of each of which is hereby incorporated by reference in its entirety.

FIELD

The disclosed technology pertains to a system for managing access and transit to resources in settings such as airplanes.

BACKGROUND

Air travel can be an extremely stressful environment both for passengers and airplane staff. Freedom of movement is often limited, with passengers being required to remain in a seat or, at best, being allowed limited movement down narrow aisles which may be blocked by service carts and/or other passengers. Staff and other resources, such as restrooms, refreshments, or even areas where someone can stand and stretch may be in short supply and high demand, leading to additional congestion, friction, and frustration for involved parties. Even where a resource is available or unused it may be unreachable due to passengers being confined to their seats or aisles being blocked by other passengers or staff. Even where a resource is available and reachable, a passenger may not be aware that it is currently available, as the resource may be located at the end of a long aisle where visibility is blocked by other seats, walls, or curtains.

These difficulties and challenges result in inefficient use of those resources, such as when they are available but parties needing the resources are unaware that they are available or are unable to easily reach them, and frustrating waits for the resources, such as when multiple parties are occupying aisles or areas near resources while waiting for them to become accessible. In addition to causing stress and frustration in a setting where anxiety is often already high, having passengers congregate in aisles and areas near resources can be a safety risk and can impede an airplane staff's duties. While the descriptions above are in the context of an airplane, many of these same or similar problems exist in other confined and restricted settings. This could include, for example, waiting rooms in health care or government agency settings that have limited restrooms, refreshments, and staff, as well as movie theaters, sports arenas, spectator events, or restaurants that have limited restrooms and narrow aisles or walkways.

What is needed, therefore, is an improved system for managing, queueing and accessing resources in these settings.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

The inventors have conceived of novel technology that, for the purpose of illustration, is disclosed herein as applied in the context of enabling access to resources. While the disclosed applications of the inventors' technology satisfy a long-felt but unmet need in the art of enabling access to resources, it should be understood that the inventors' technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

The disclosed technology may be implemented in a variety of settings in order to receive information from and provide information to occupants or potential occupants of those settings that may be used to efficiently transit to and make use of resources. An airplane provides a useful context for discussion of the type of setting that the technology may be useful within. The system may be implemented in an airplane as an additional set of devices, or retrofitted using existing devices, or a mixture of both. When implemented, the system may be used to provide active traffic management functions for passenger transit to resources, such as restrooms, and access to those resources. Such active traffic management could include receiving an indication from a passenger that they would like to access a resource, and providing an indication to that passenger of which resources they should proceed to, when they should proceed, and in some cases what route they should take to reach the resource. A combination of information from different sources, for example, sensors, personal mobile devices, seat-back devices, may be used by a server implementing one or more active queue and transit management methods, functions, or activities to allow traffic to efficiently flow to and utilize limited resources, such as restrooms, in an airplane or other settings.

Figure 1:
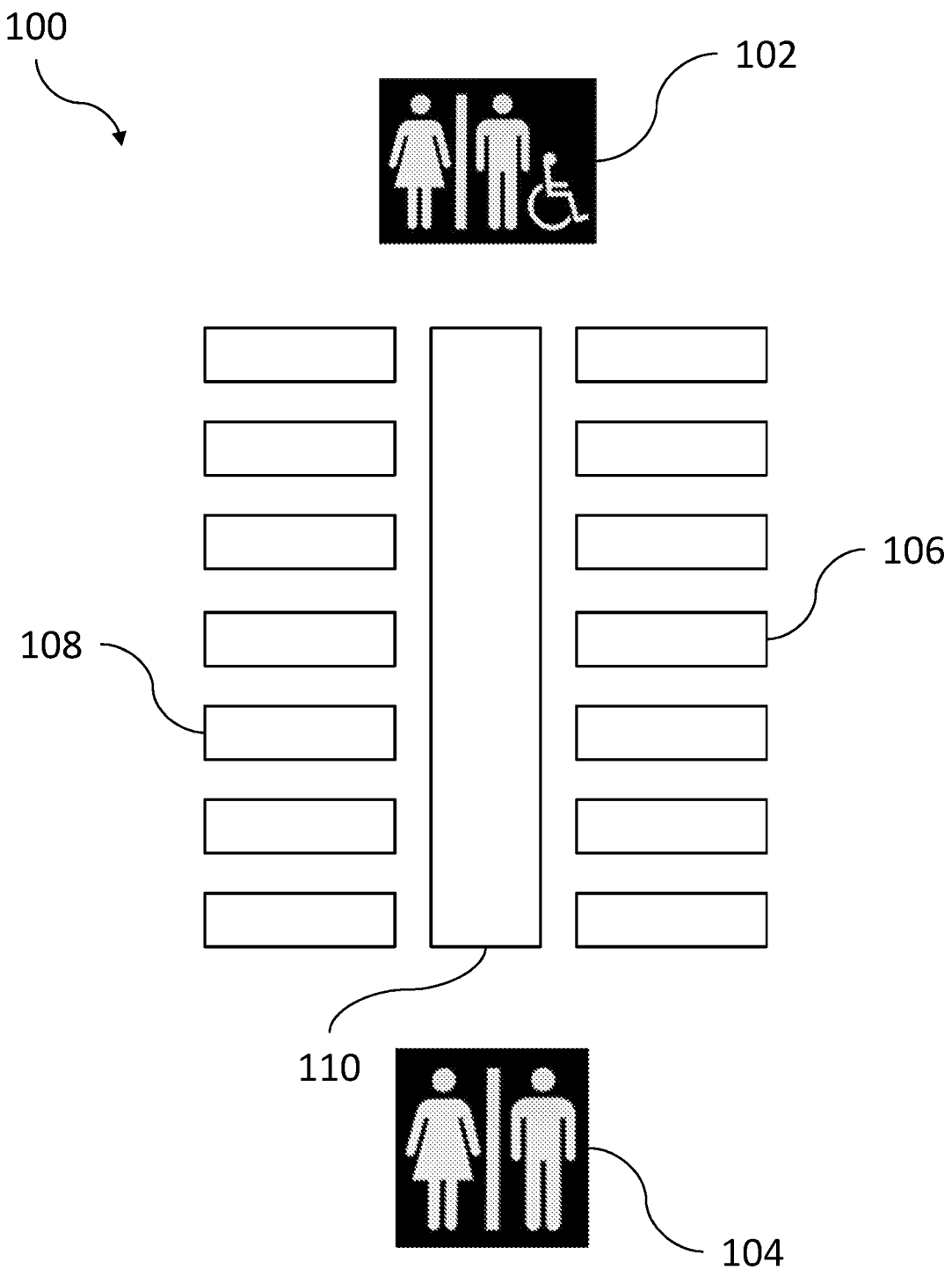
FIG. 1 is a top down diagram showing an exemplary airplane setting.

FIG. 1 is a top down diagram showing an exemplary airplane setting (100). While the disclosed technology could be used in a variety of settings, including airplanes, movie theaters, restaurants, sports venues, spectator settings, and others, FIG. 1 and the related discussion will focus on an airplane setting (100). In the exemplary airplane setting (100), an aisle (110) provides a walking path from a number of seat rows (106, 108) in a column so that a resource at each end of the aisle (110) such as a restroom, staff member, refreshment, or other similar resource may be reached. A first restroom (102) is available at one end of the aisle (110), while a second restroom (104) is available at the other end of the aisle (110). While the types of resources available via the aisle (110) may vary, in the shown diagram the first restroom (102) may be a handicap accessible bathroom, family bathroom, or some other specialized bathroom, and the second bathroom (104) may be a regular bathroom.

The aisle (110) is typically of a width that one person of average size may walk forward in the aisle (110) without turning their body to avoid the seat rows (106, 108). Typically, the aisle (110) is not wide enough for two passengers to easily cross paths while in the aisle (110), and is not wide enough to allow a passenger to pass a service cart that is present in the aisle (110). The specialized (102) and regular (104) bathrooms available in an airplane typically allow for one occupant, or at most one occupant and a child or assistant. The seat rows (106, 108) may vary in characteristics and number and will depend greatly on the size and capabilities of a particular airplane. Each column of seats may have, for example, between 10 and 40 rows of seats, with each row of seats having, for example, 3-5 seats. However, whether an airplane has a passenger occupancy of 10-20, or even 800 or more, the technology disclosed herein may be effectively implemented to ease friction and manage and enable access to limited resources. The same is true of movie theaters with tens or hundreds of seats, and sports venues or other spectator settings having thousands or tens of thousands of seats. As can be seen from FIG. 1, the number of passengers that may be present in the seat rows (106, 108) would greatly exceed the traffic capabilities of the aisle (110) and the restrooms (102, 104) if even a tenth of the passengers were to immediately enter the aisle (110) and attempt to access a restroom (102, 104).

Figure 2:
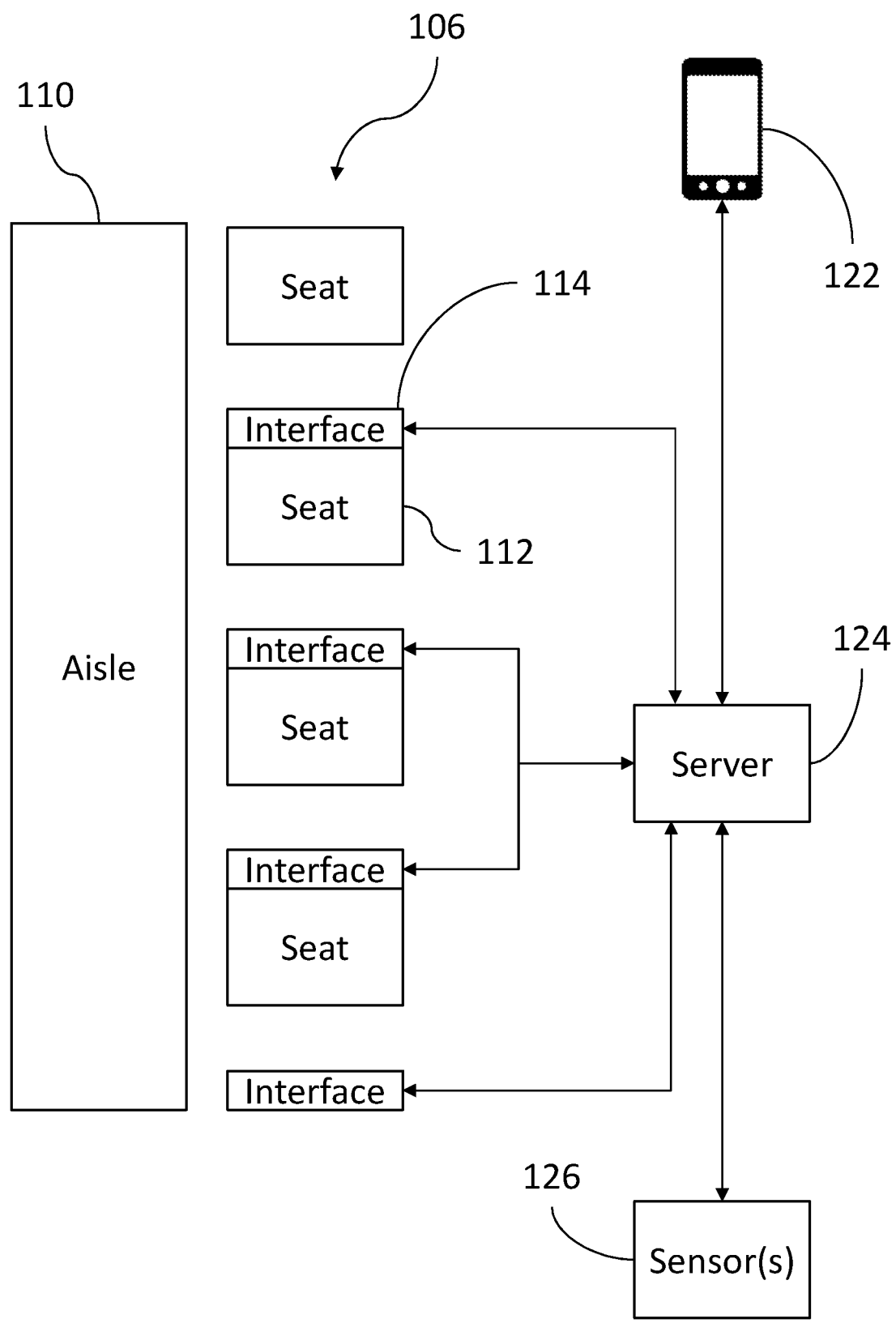
FIG. 2 is a top down diagram showing a magnified view of a portion of the exemplary airplane setting.
Figure 3:
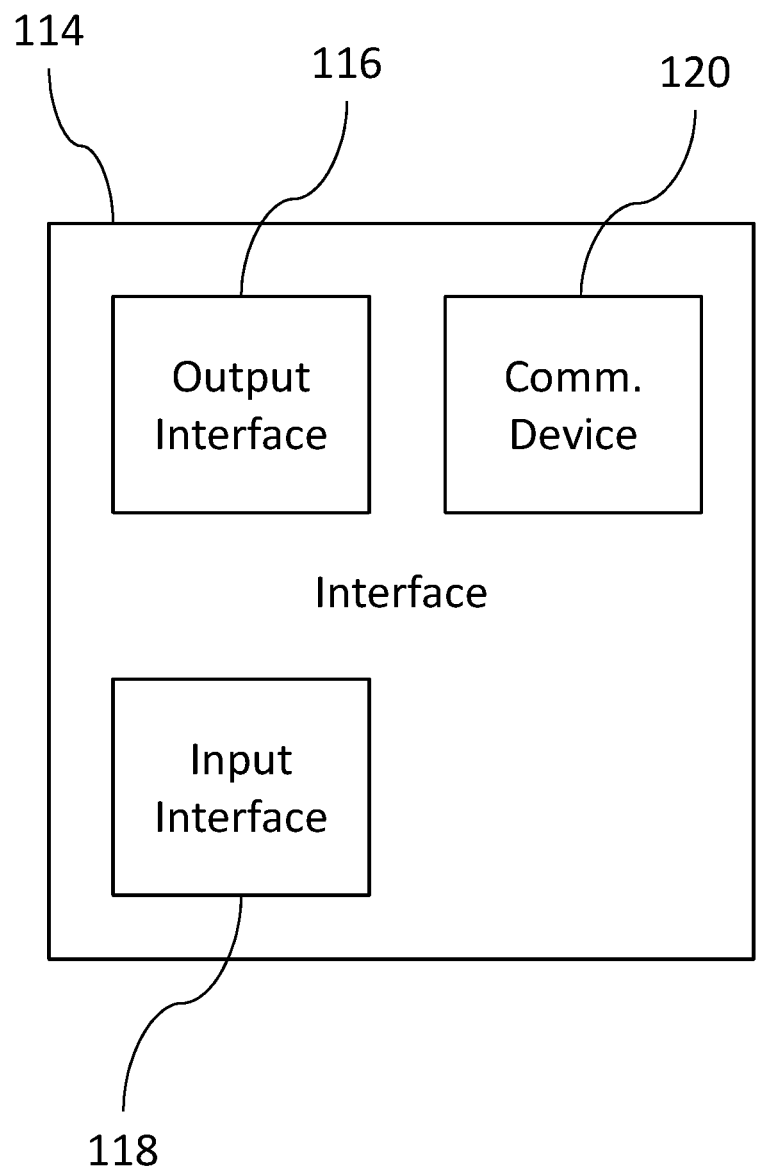
FIG. 3 is a schematic diagram of an exemplary interface device available at a passenger seat.

The disclosed technology and system for managing queuing and transit to resources may be implemented in different ways depending upon the particular setting that they are intended for. In some settings, the technology may be built into a setting using proprietary devices and custom integration, while in others it may be retrofitted into a setting using the pre-existing systems and devices that are available already, or a mixture of both. FIG. 2 is a top down diagram showing a magnified view of a portion of the exemplary airplane setting that may have a system for enabling access to resources integrated with existing devices. A single seat (112) of several seat rows (106) is shown next to the aisle (110). Each seat (112) has an exemplary interface (114) located proximately to the seat (112) that an occupant of that seat (112) may view and interact with. The exact features of the interface (114) may vary depending upon a particular airplane. FIG. 3 shows a schematic of an exemplary interface (114), which includes an output interface (116) that may be used to provide information to a seat occupant, an input interface (118) that may be used to receive information from a seat occupant, and a communication device (120) that may be used to communicate with other devices via, for example, a wireless or wired network. For example, in some cases the interface (114) may be a seat-back, bulkhead, or in-seat digital interface allowing an occupant of the seat (112) to select to receive, via an output interface (116) such as a LCD screen or sound device, various media and information by interacting with the interface (114) via an input interface (118) such as a touch screen, buttons, track pad, or other devices. In other cases, the interface (114) may be a series of buttons and light indicators, available on a seat back or arm rest, that may be interacted with to signal airplane staff, affect air conditioning or lighting, or other functions.

Each of the interfaces (114) may be directly or indirectly in communication with a server (124). The server (124) may be an existing computer system available on the airplane, or may be a computer system installed within the airplane when the system is configured for use on the airplane. The server (124) may also be some form of distributed network or computing device, and could, for example, be implemented using blockchain technology to leverage storage and processing of a plurality of devices spread across a particular environment or wide area network. The server (124) may be configured with a set of instructions that may be executed to perform one or more queuing and transit management functions in response to information from one or more interfaces (114) or other devices. The server (124) may also be configured to receive information from one or more mobile devices (122) that may be used in active management of queuing and transit. This may be different information than what is received from the interface (114) or the same, such that a mobile device (122) may be used to interact with the system in place of an interface (114). In some implementations, the mobile device (122) may be configured with software (e.g., a mobile application installed to the device) and information (e.g., providing a seat number or other position indicator) to provide the same functionality with the server (124) as the interface (114).

The server (124) may also be configured to receive information from one or more sensors (126) placed about the airplane that may be used in active management of queuing and transit. Sensors could include, for example, motion, object, temperature, or other characteristic sensors placed about the aisle (110), seat rows (106, 108), restrooms (102, 104), or other locations, and sensors may detect and generate information indicating the presence of persons or objects in those areas, or other characteristics about those areas. Sensors (126) may also include one or more components on a mobile device (122) held by a passenger, including, for example, accelerometer output from the mobile device (122) indicating whether the user is walking or sitting.

Figure 4:
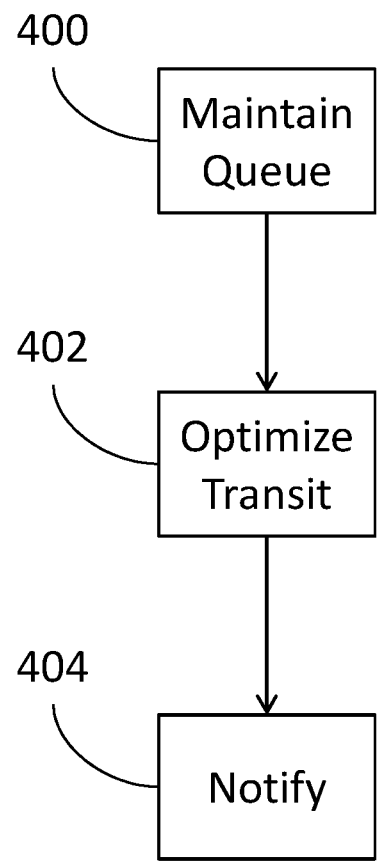
FIG. 4 is a flowchart of an exemplary set of high level steps that could be performed to manage queuing and transit to one or more resources.

FIG. 4 is a flowchart of a set of high level steps that could be performed to manage queuing and transit to one or more resources. These steps could be performed by a system configured to execute instructions to perform the steps, the system comprising one or more of the server (124), the interfaces (114), mobile devices (122), or other devices. The configured system would maintain (block 400) a queue of users that had requested access to a resource. Such requests could be manually entered by a staff member, automatically entered based upon feedback or data generated by a sensor (126), or could be manually requested by a user via an interface (114), for example. Maintenance of the queue could include basic queue management such as first-in first-out prioritization, or could include automatic reprioritization within the queue based upon such factors as passenger age, passenger condition, seat type, seat location relative to the resource, actual or predicted availability of the resource, a level of immediacy of the need as indicated by the passenger, or other factors, as well as manual reprioritization such as voluntary swapping or delaying of positions within a queue.

The configured system would also optimize (block 402) transit to and access of the resources. In certain embodiments, the configured system includes making a determination of the particular resource that a particular requester should proceed to. In certain other embodiments, the configured system includes making a determination of when the requester should proceed to the resource, based upon at least, in part, resource availability, pathway clearance, scheduled cart presence in aisles, and/or flight deck approval. In yet other embodiments, the configured system includes making a determination of the path that the requester should take. Such a determination could be made based upon factors and information available to the system such as location of the resource, type of resource needed (e.g., a standard bathroom or a specialized bathroom offering additional features specific to child care or disability), immediacy of need or special condition of the requester, size of aisles, scheduled service cart presence in aisles, or other factors.

This optimization (block 402) determination could also be made based upon information from one or more sensors (126) and could include, for example, information from an occupancy sensor indicating that a particular restroom is occupied or unoccupied, an aisle sensor indicating that one or more passengers are congregating in an aisle or waiting area along a path that would need to be taken to reach a particular resource, a set of seat sensors indicating that a high number of passengers are not currently present in their seats and may be in aisles, a cart or aisle sensor indicating that a service cart is present in an aisle or waiting area, or other information from various sources. This determination could also be made based upon information from a native system or device of the airplane or other setting that the system is implemented within, and could include information indicating a need to stay seated due to turbulence, weather, or other emergency, or a need to delay use of the resource for any circumstance (e.g., a fire alarm may require that a user of the system evacuate the setting rather than continue waiting for or proceeding to the resource).

The configured system would also notify (block 404) users and provide some or all of the information determined during the transit optimization (block 402) step. These notifications could be provided via an interface (114), a mobile device (122), or another device within the setting. Notifications could include, for example, an indication of a requester's position in the queue or an estimated wait time until the resource becomes available to the requester, an indication that the requester should proceed to the resource, an indication of which resource a requester is waiting for, and in some cases a particular route or particular aisle (110) that a requester should use to reach the resource.

The disclosed technology includes other features and methods for improving access and use of airplane resources that may be used individually or in combination with the general method of FIG. 4. While the method of FIG. 4 helps to provide requesters controlled access to a resource such as a restroom, it may not improve overall availability of the resource since it is reactive to a request. For example, in an airplane with four restrooms, each of the restrooms may be entirely unused for an hour, and then receive ten to fifteen requests for access in quick succession. While these requesters will have the advantage of proceeding to the resource in a controlled manner after receiving notification, and having knowledge of the approximate wait time, one or more of them will still have some wait time.

Figure 5:
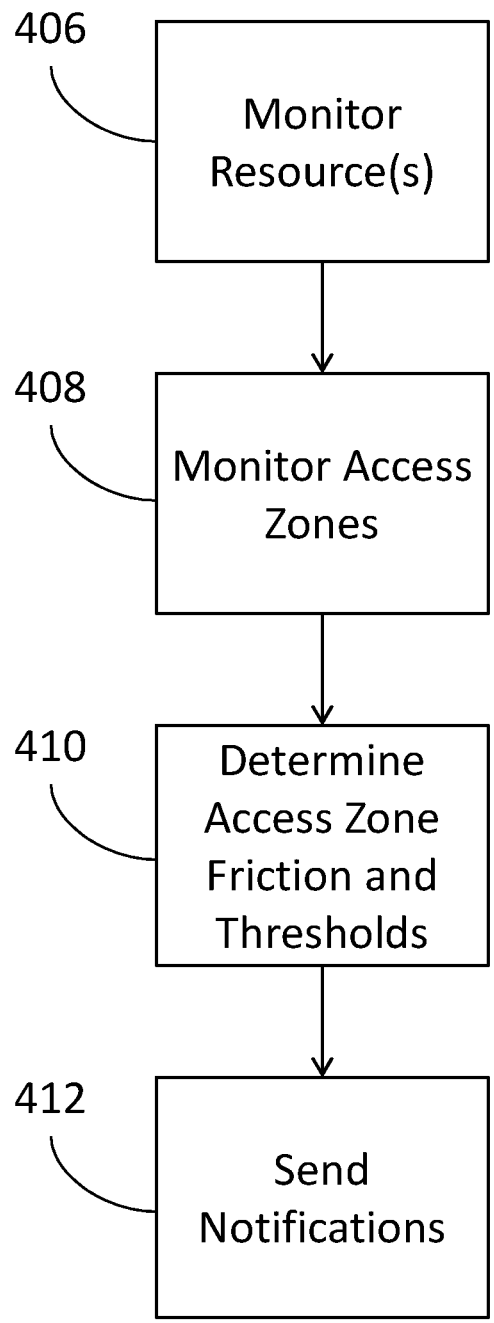
FIG. 5 is a flowchart of an exemplary set of high level steps that could be performed to proactively manage access to resources in an environment.

One way to improve on the efficiency of access and use of resources is to offer and even promote access to resources proactively rather than reactively. FIG. 5 shows an exemplary set of high level steps that may be performed in order to proactively manage access to resources in an environment such as an airplane. The steps of FIG. 5 could be performed instead of or in addition to other methods of providing access to resources, such as the steps of FIG. 4. A system configured to perform the steps of FIG. 5 would monitor (406) the state of one or more resources, by way of automated feedback from sensors (126) or manual input from users or other persons.

The system would also monitor (408) one or more access zones associated with the one or more resources. An access zone can be thought of as a collection of one or more persons having some similar characteristics that could impact the amount of congestion, difficulty, frustration, or friction they are willing to endure in order to access a particular resource. A particular environment may have one access zone or multiple access zones, and a particular individual with an environment may be a member of one or more access zones, or may be the only object within a particular access zone (i.e., an access zone comprised of a single person). While access zones may frequently have a spatial or physical similarity shared by the persons they represent, such as where an access zone is defined as the persons having an aisle seat in an airplane, this is not always the case. For example, in a virtual environment (e.g., an online file distribution network) where a virtual resource is being shared (e.g., a set of downloadable files), access zones may instead be delineated by factors such as maximum download speed, maximum storage capacity, internet service provider, IP address, or other factors.

With that understanding of access zones, access zone monitoring (408) can be described as monitoring the state of one or more access zones automatically, by way of sensors (126) or other devices, or manually based upon inputs from users or other persons. For example, the hypothetical access zone comprised of individuals having an aisle seat on an airplane or other seated environment could be monitored by sensors (126) to determine how many are seated or standing at any given time, whether aisleways nearby are blocked by a service cart or other passengers, or other situations. While resource monitoring (406) can be thought of as gathering information on and virtualizing the physical state of one or more resources, access zone monitoring (408) can be thought of as gathering information on and virtualizing the physical state of one or more access zones that may access those resources.

The system may also regularly determine (410) access zone friction and thresholds based upon information received during resource monitoring (406) and access zone monitoring (408). Focusing on the relationship between a particular resource (or, in some cases two or more closely related resources) and a particular access zone, a system can, using the information available from the sensors (126), determine the relative difficulty or friction for any member of that access zone to access that resource based upon factors such as congestion, distance of travel, and seat position within an aisle. The system may also, for a particular resource (or two or more closely related resource) and a particular access zone, determine an estimated friction threshold for that access zone. A friction threshold may be thought of as being the amount of desire that a member of that access zone may have to access that resource at that time.

The system may then send (412) notifications to members an access zone, via the interface (114) or the mobile device (122) when the determined friction for that zone falls below the friction threshold for that zone, indicating a resource that is at low utilization and, in some implementations, a path that they should take to reach the resource. Operating in this manner, the effect over a period of time will be that during periods where utilization of one or more resources is relatively low, or conditions are otherwise favorable for making use of the resource, the system will proactively promote utilization of the resource to one or more persons that may have a current or future desire to use the resource that they have yet to act upon. By proactively driving utilization of a resource during periods of low utilization based upon friction (i.e., the difficulty associated with using the resource) and desire (i.e., the threshold of difficulty that a particular person is willing to endure to use the resource), later bottlenecking of the resource may be avoided.

Figure 6:
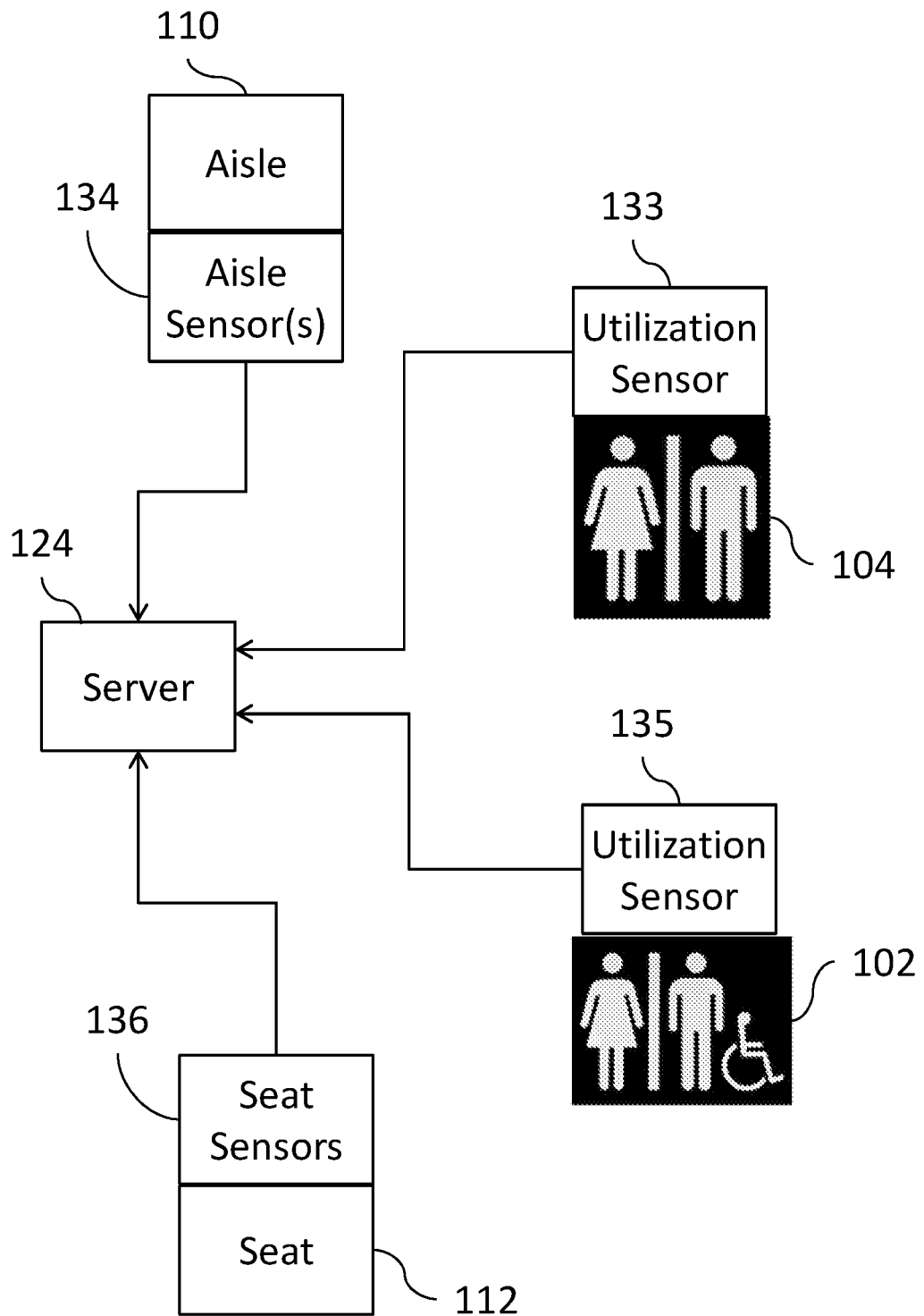
FIG. 6 is a schematic diagram of an exemplary set of sensors installed throughout the exemplary airplane setting.

FIG. 6 shows a diagram of an exemplary configuration of sensors (126) that may be used to produce data that the server (124) may use in determining friction associated with the use of a resource by a person in an access zone and desire that a person in that access zone may have to use the resource. In the exemplary configuration, a restroom (104) has a utilization sensor (133), and a handicapped restroom (102) also has a utilization sensor (135). The utilization sensor (133) may be any type of sensor or device that may be used to determine whether the restroom (104), or, in different examples, any resource, is currently available for use. The utilization sensor (133) for the restroom (104) may take the form of a door lock sensor that reports whether the restroom (104) door has been locked from the inside, a light sensor or circuit that detects whether a light in the restroom is turned on or off, an entryway sensor that detects when a person enters or exits the restroom, a motion, heat, weight, pressure, sound, or proximity sensor that detects whether a person or other object is occupying the space within the restroom (104), or similar sensors. In some implementations, the utilization sensor (133) may also be configured to cause an external indicator such as a light, sound device, or other device to provide an indication that the resources is in use. The utilization sensor (133) may also, in some implementations, be configured to determine whether there are persons outside the restroom (104) waiting for it to become available, how many persons are waiting, or both. This could be achieved with an imaging device or proximity sensor placed outside the restroom (104) and directed at the area where persons routinely wait for access.

The utilization sensor (135) has the same capabilities as the utilization sensor (133), and is capable of determining utilization of the handicapped restroom (102). In other implementations with different resources, an appropriate utilization sensor may be an electronic circuit or software application that determines whether a particular resource is currently activated or deactivated. For example, if the resource in question is a computer, a software application may report the computer as being available when no user is logged into it, or a network device may report the computer as being available when it is not sending or receiving traffic via the network. As another example, a utilization sensor could also include a user device or mobile device possessed by a user that self-reports a location or utilization status of a resource. Selection of an appropriate utilization sensor for a given resource will be apparent to one of ordinary skill in the art in light of this disclosure.

In the exemplary diagram, one or more of the aisles (110) may have an aisle sensor (134) or set of sensors, and one or more of the seats (112) may have a seat sensor (136) or set of sensors. While associated with the resources in question (e.g., the restroom (104) and the handicapped restroom (102)), these sensors do not directly determine utilization of resources and instead determine environmental characteristics associated with resources that may influence friction and desire associated with use of a resource. The aisle sensor (134) may include sensors that determine whether a person or object is fully or partially blocking an aisle, which areas of an aisle are blocked or obstructed, which direction along an aisle an obstruction is moving and at what pace, the number of discrete persons or objects within an aisle, or other similar characteristics of an aisle. The aisle sensor (134) may also be a sensor on an object or person within the aisle, such as a sensor on a service cart or flight attendant that reports their position within the aisle (110), or a personal device such as the mobile device (122) that reports the position of its holder within the aisle (110). Characteristics of the aisle (110) may be useful in determining friction associated with using a resource such as the restroom (104) because the aisle (110) must be traversed by a person leaving the seat (112) and proceeding to the restroom (104).

The seat sensor (136) may include sensors that determine whether one or more seats such as the seat (112) are currently occupied. The seat sensor (136) may include a seat position sensor, a weight or pressure sensor, a motion, object, heat, or proximity sensor, or even a sensor on a personal device such as the mobile device (122) that may determine whether a person is currently seated in the seat (112). Seat occupancy may be a factor that determines friction associated with accessing a resource for an access zone. For example, in the case of an airplane, if it can be determined that thirty passengers out of forty are currently seated, that may indicate that some passengers will have an easier time leaving their seat (e.g., if one of the 10 standing passengers has left a seat in that passenger's row) and accessing the aisle, but may have a harder time traversing the aisle (e.g., if one or more of the 10 standing passengers are standing in the aisle) in order to reach a resource. Such information could be balanced against information from the aisle sensor (134) and other sources in determining friction for accessing the resource. At a more granular level, if it can be determined that in a four-seat row only the passenger in the window seat is currently seated, such information could be used to determine that the window seat passenger is currently at a very low friction for leaving their row and accessing a resource, since they will not have to climb over or displace the others in their row. A system may perform one or both of these determinations, or other similar determinations, based upon information from the seat sensor (136).

The seat sensor (136) may also include sensors or devices that determine, at a very high level and without impacting personal privacy, an activity that a person in the seat is currently performing. This could include, for example, a sensor or device of the interface (114) that can report whether the user is watching a movie or interacting with the interface (114) in some manner, which may indicate that the user is seated and occupied, and so desire to access the resource will be lower than a user who is not watching a movie or interacting with the interface (114). This could also include a personal device such as the mobile device (122) reporting whether the user is currently making a phone call or watching media on their phone, which could also indicate that they are occupied and have a lower desire to access a resource at that moment. This could also include a personal device such as a wearable watch, fitness device, or other smart device that could report characteristics about a wearer that might indicate they are currently asleep and are at a resultingly low desire for accessing the resource.

Figure 7:
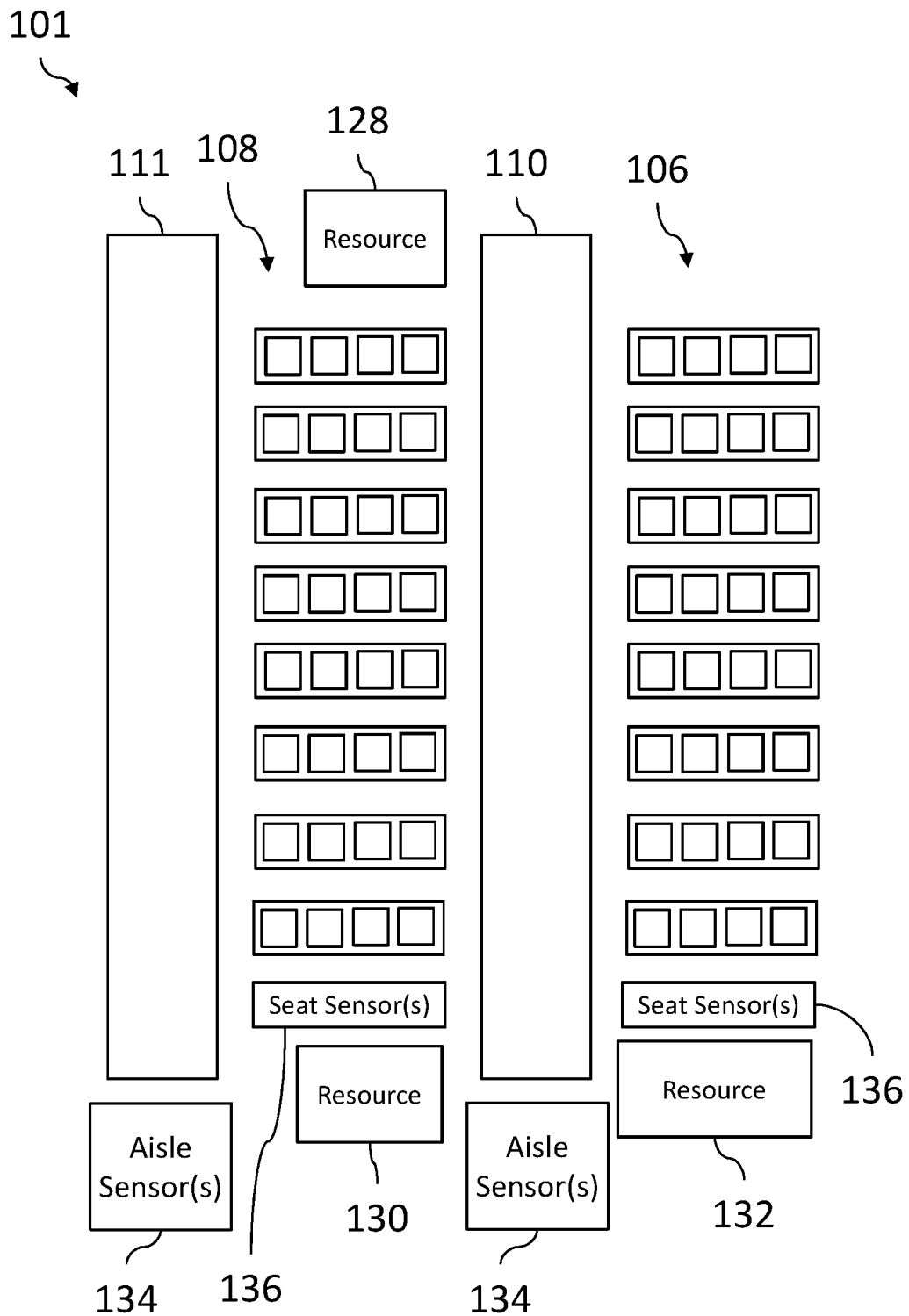
FIG. 7 is a top down diagram showing a seat layout of the exemplary airplane setting.

As has been previously mentioned, access zones could be defined in a variety of ways, and as a result some individual passengers may be members of multiple access zones, with the most populous access zone including every person in an environment such as an airplane, and the least populous zone containing only an individual person. The server (124) may be configured to constantly, and in parallel, determine friction and desire for this plurality of access zones as changing characteristics of the resources and surrounding environment become available. FIGS. 7-12 show diagrams of an airplane environment and several possible access zones that might be defined and calculated in this way within an airplane (101). As can be seen in FIG. 7, the airplane (101) has a first column of seats (106) and a second column of seats (108), each having eight rows of four seats, or thirty-two total seats per column. The aisle (110) separates the first column of seats (106) and the second column of seats (108), and a second aisle (111) is located on the other side of the second column of seats (108).

A first resource (128), a second resource (130) and a third resource (132) are positioned about the airplane (101) to be variously accessible by way of the aisle (110) and the second aisle (111). The diagram also shows the aisle sensor (134), which may comprise one or more sensor types distributed to gather information on the two aisles, and the seat sensor (136), which may comprise one or more sensor types distributed to gather information on the sixty-four total seats of the two seat columns.

Figure 8:
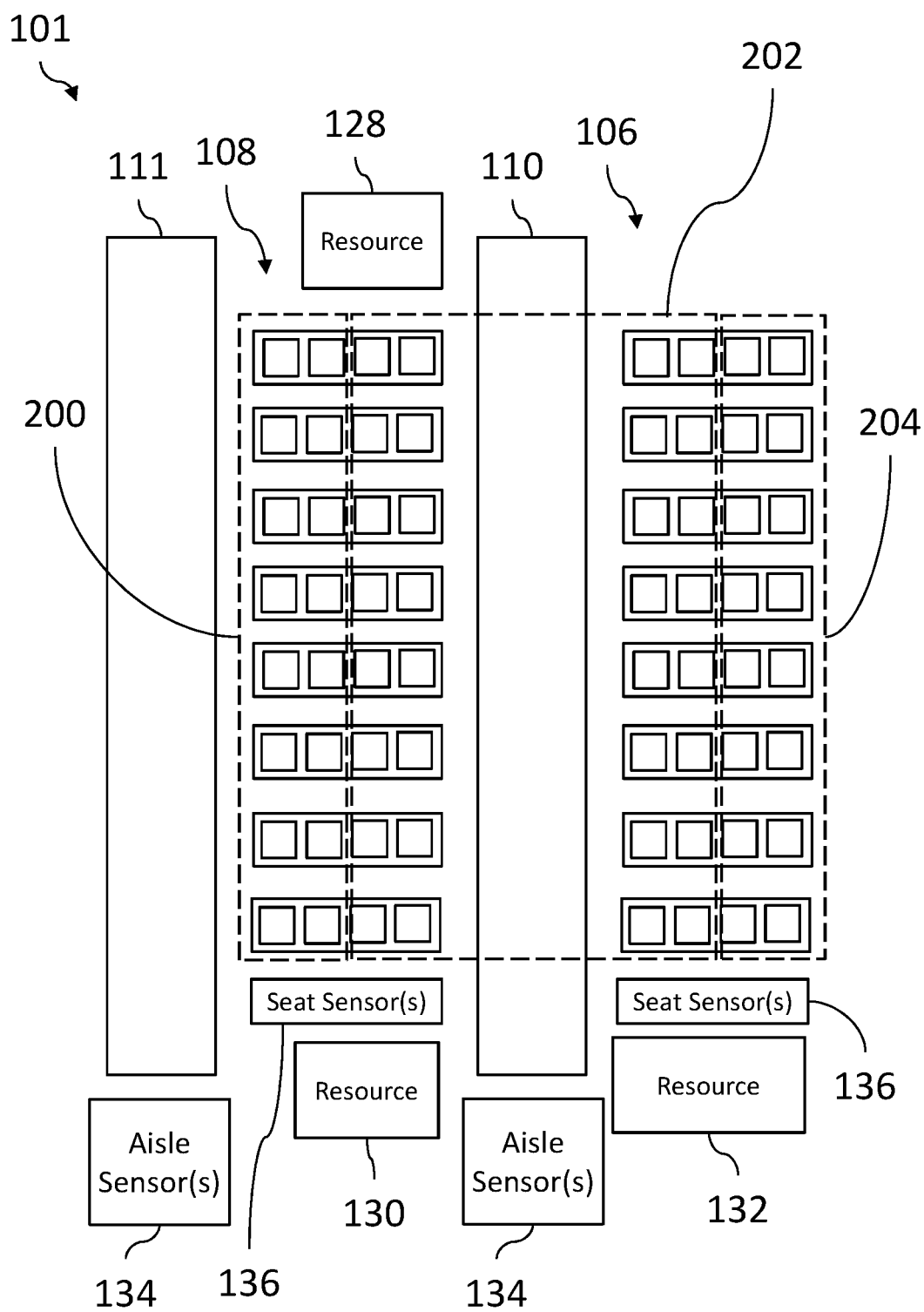
FIG. 8 is a top down diagram showing the seat layout with a set of exemplary access zones sectioned off by dashed boundaries.

FIGS. 8-12 show various exemplary access zones denoted by dashed lines surrounding one or more seats of the first column of seat (106) and the second column of seats (108). It should be understood that while it is possible to only have one configured access zone, it is also possible to have two or more of the shown exemplary access zones be configured and considered near-simultaneously. FIG. 8 shows an access zone (200) that contains seats that may be grouped due to ease of access to the first resource (128) and the second resource (130) by way of the second aisle (111). An access zone (202) contains seats that may be grouped due to ease of access to the first resource (128), the second resource (130), or the third resource (132) by way of the aisle (110). An access zone (204) contains seats that may be grouped due to the difficulty in crossing through seats of the access zone (202) in order to reach the aisle (110).

Based only on factors shown in FIG. 8, the access zone (200) may have the lowest friction for accessing the first resource (128) or the second resource (130) due to ease of reaching the second aisle (111), and the relatively low density of persons (i.e., mainly those from the access zone (200)) using the second aisle (111) to reach resources. The access zone (202) may have the second lowest friction, due to the ease of reaching the aisle (110), but the relatively difficulty of sharing the aisle (110) with all persons in the access zone (202) and the access zone (204). The access zone (204) may have the highest friction, due to the difficulty in reaching the aisle (110) through the access zone (202), and the density of use of the aisle (110).

Figure 9:
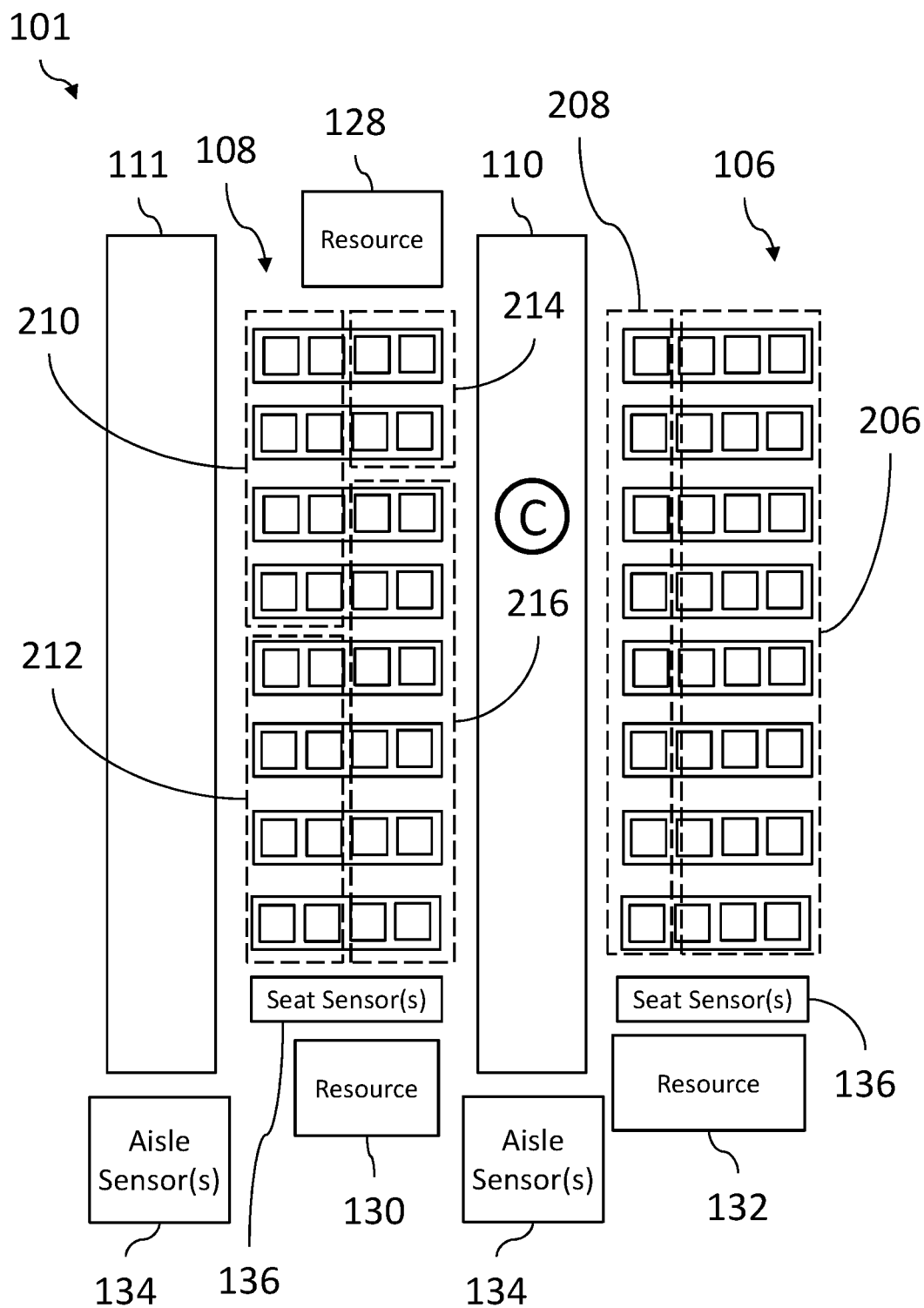
FIG. 9 is a top down diagram showing the seat layout with an alternate set of exemplary access zones sectioned off by dashed boundaries.

FIG. 9 shows an access zone (206) that contains seats that may be grouped due to difficulty of reaching the aisle (110) past the aisle seat. An access zone (208) contains seats that may be grouped due to being aisle seats, and the ease of access to the aisle (110). An access zone (210) contains seats that may be grouped due to the ease of reaching the second aisle (111), and the proximity to the first resource (128), while an access zone (212) is similarly grouped due to the ease of reaching the second aisle (111), and the proximity to the second resource (130). As can be seen, these access zones may be statically configured, since the reason for their grouping (i.e., the ease of access to a nearby aisle and proximity to a resource) does not change.

Conversely, an access zone (214) and an access zone (216) may be configured by the system dynamically based upon environmental conditions within the aisle (110). For example, if a service cart were moving down the aisle (110), and one or more aisle sensors (134) were able to determine its location as being in the aisle (110) at the border the access zone (214) and the access zone (216), these dynamically configured access zones may account for the service carts presence. Once configured, the access zone (214) contains seats that may be grouped due to the ease of access to the aisle (110), and the proximity and ease of access to the first resource (128) without having to pass by the service cart. Similarly, the access zone (216) contains seats that have ease of access to the aisle (110), and ease of access to the second resource (130) or the third resource (132) without having to pass by the service cart. These dynamic access zone could be created and discarded dynamically as conditions within the aisle (110) change, such that the access zone (214) might be discarded as the service cart continues to move along the aisle and the grouping is less relevant.

Figure 10:
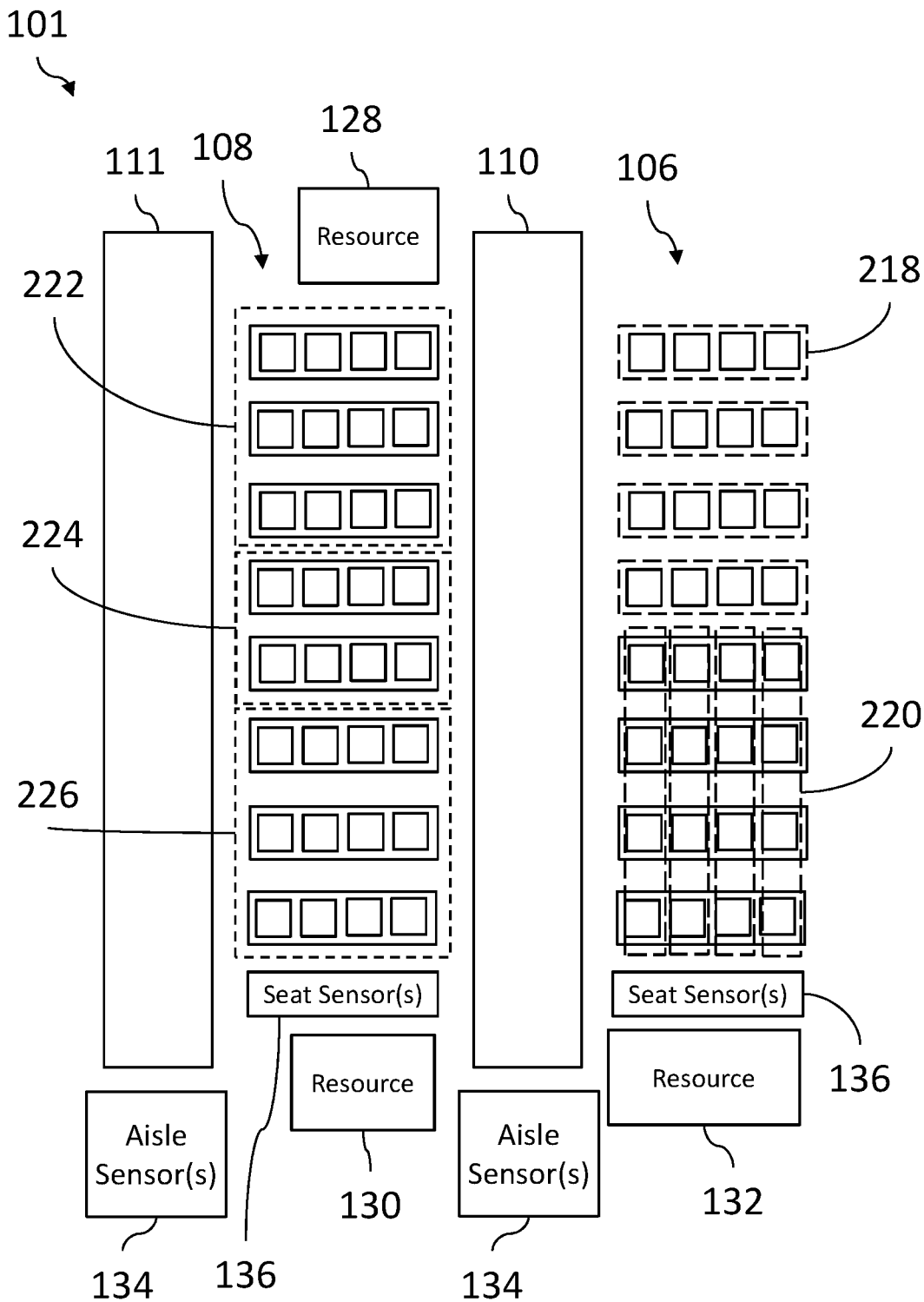
FIG. 10 is a top down diagram showing the seat layout with an alternate set of exemplary access zones sectioned off by dashed boundaries.

FIG. 10 shows further exemplary access zones. An access zone (218) contains seats that are grouped by rows, while an access zone (220) contains seats that are grouped by columns, each of which may allow for friction to be determined row by row or column by column to provide rolling friction determinations. An access zone (222) is grouped based upon proximity to the first resource (128), while an access zone (226) is grouped based upon proximity to the second resource (130) and third resource (132). An access zone (224) is grouped based upon being midway between the first resource (128) and the second resource (130).

Figure 11:
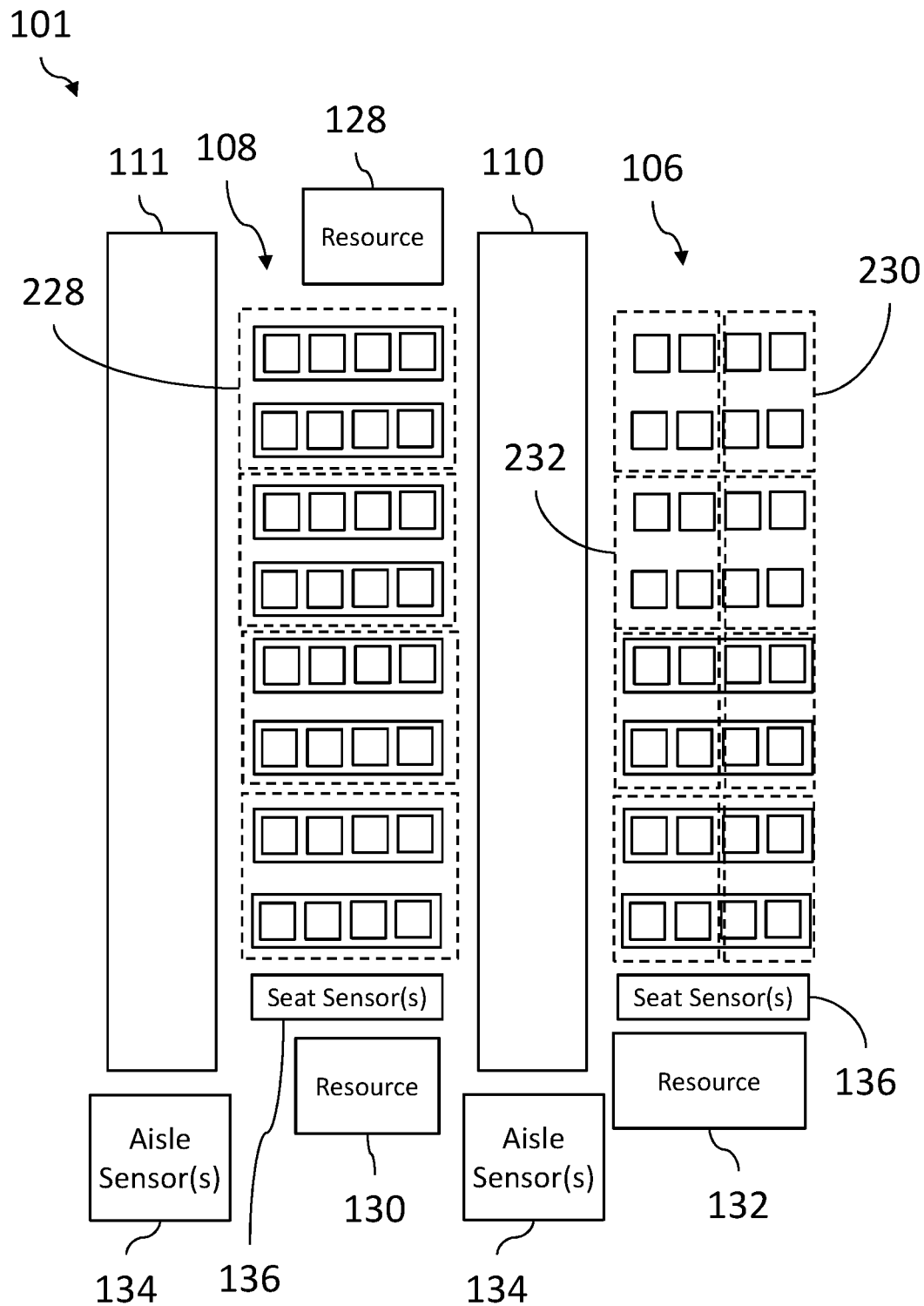
FIG. 11 is a top down diagram showing the seat layout with an alternate set of exemplary access zones sectioned off by dashed boundaries.
Figure 12:
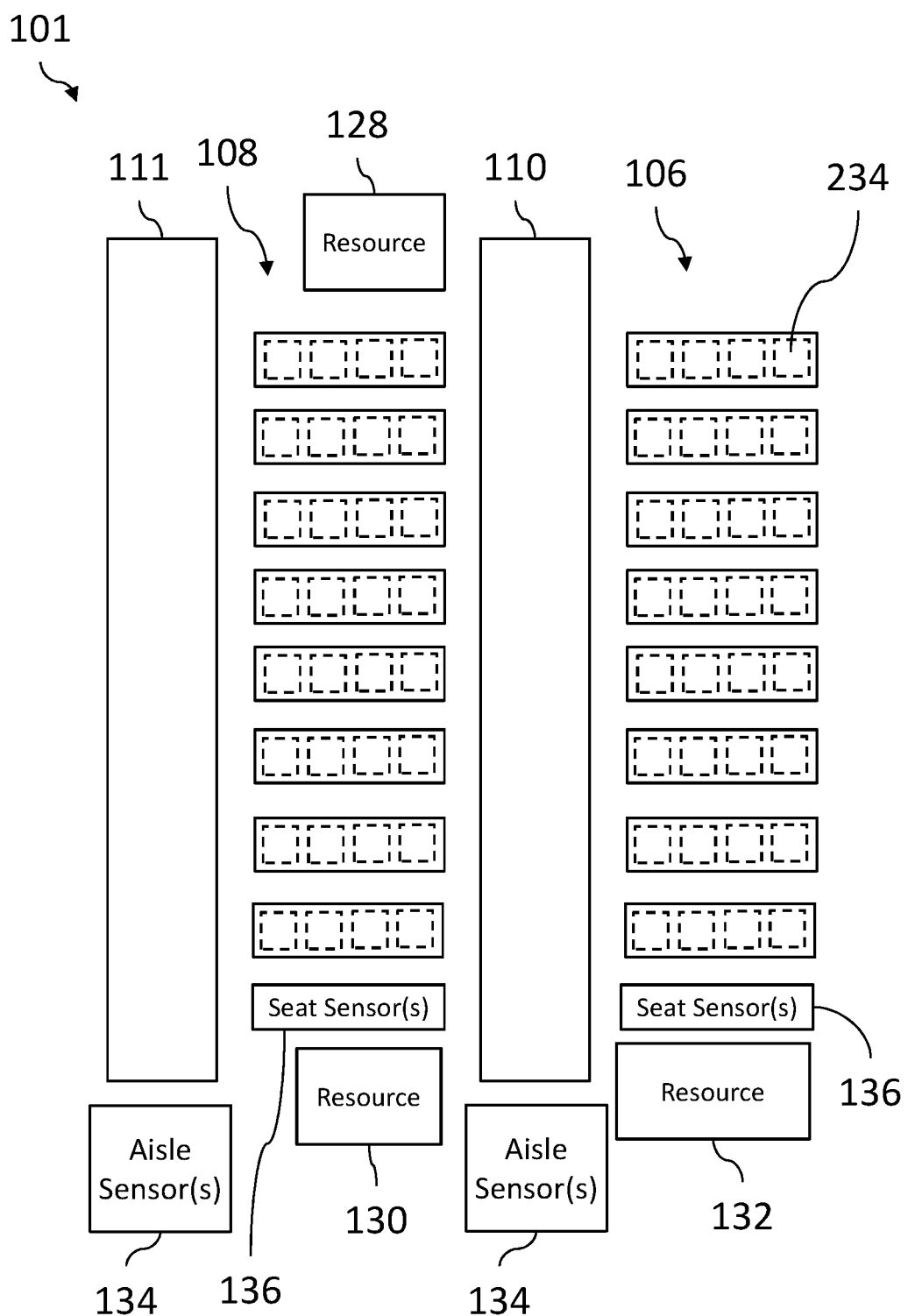
FIG. 12 is a top down diagram showing the seat layout with an alternate set of exemplary access zones sectioned off by dashed boundaries.

FIG. 11 shows yet further exemplary access zones. An access zone (228) is grouped into eight-seat blocks, while an access zone (230) and an access zone (232) are grouped in four-seat blocks, with the access zone (230) having more difficult access to the aisle (110) and the access zone (232) having easier access to the aisle (110). FIG. 12 shows the most granular access zone, an access zone (234) that contains a single seat, with each of the sixty-four seats of the airplane (101) being its own access zone. While this may represent the most accurate access zone, with each individual having their personal and environmental characteristics considered when determining their friction, it is also the most resource intensive in terms of processing and storage requirements. In implementations where input data from sensors is limited enough that seat by seat determinations are unnecessary, or where processing requirements exceed available resources, a balance must be found between the granularity of per-seat access zones shown in FIG. 12, and the opposite, a single access zone covering the entirety of the airplane (101).

Figure 13:
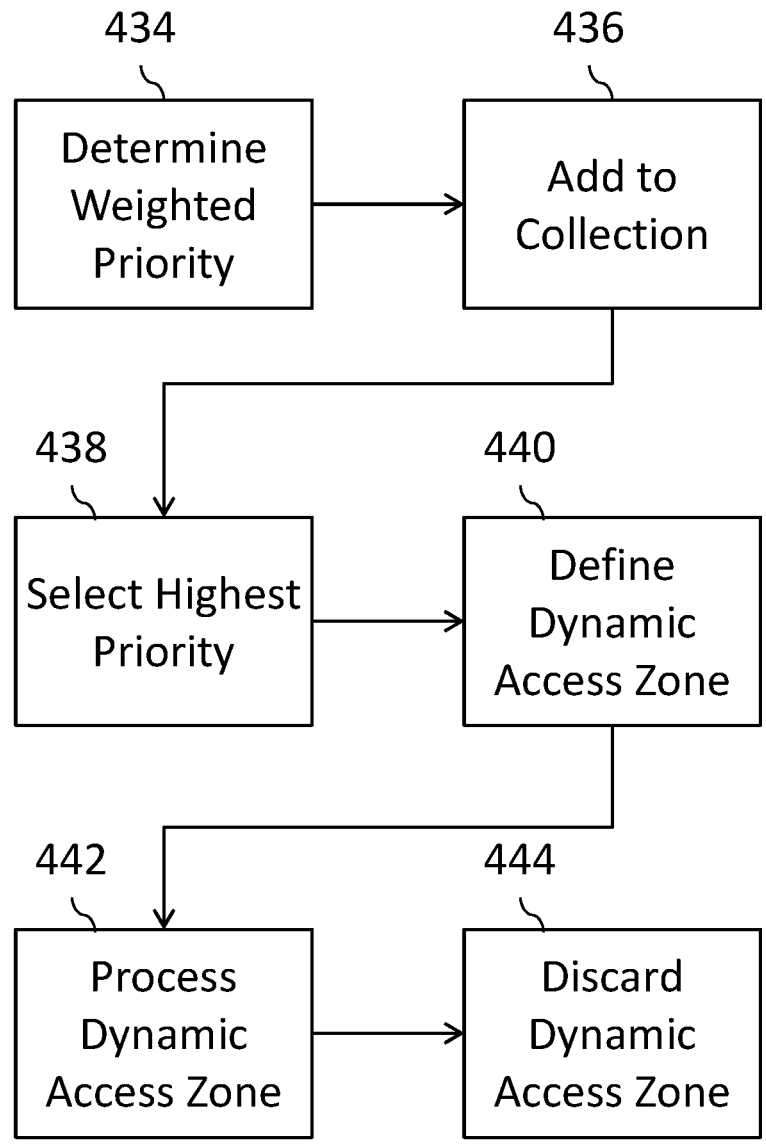
FIG. 13 is a flowchart showing an exemplary set of steps that may be performed to manage the creation of dynamic access zones.

This balance can be achieved by combining a number of static access zones that are configured based upon common factors such as proximity to resources and initial access cost (e.g., leaving a seat deep within a row versus leaving an aisle seat) with rules for creating dynamic access zones based upon impactful and temporary changes in the environment of the airplane. FIG. 13 shows one exemplary set of steps that may be performed to determine when dynamic access zones should be created. Any new piece of data becoming available to the system, either from the sensors (126) or another source, represents a potential scenario where a dynamic access zone could be created in order to provide more accurate recommendations for accessing a resource. However, the impact of newly available information could vary greatly. The example of a service cart moving through the aisle (110) described in the context of FIG. 9 is one example where a dynamic access could provide more helpful recommendations in response to the presence of the service cart. As an opposite example, the presence of a single flight attendant in an aisle may represent less impact, as the flight attendant is more mobile than a service cart, is unlikely to occupy the aisle for a lengthy period of time, and represents less of a complete obstruction of the aisle as compared to the service cart.

To determine when the system may benefit from the addition of a dynamic access rule, the system may determine (434) the weighted priority of newly available data as it arrives from the sensors (126) or other sources. One example of determining weighted priority is to assign each piece of data, based upon its type or source, a priority score based upon the impact that the real-world characteristic represented by that piece of data will have on one or more of the access zones. For example, referring to FIG. 9, the presence of the service cart at the border of the access zone (214) and the access zone (216) will have an impact on the access zone (208) and the access zone (206). The service cart is slow moving and impassable, so it may be assigned a priority score of 100 on a scale of 1 to 100. With an impact score of 100, and the potential to impact the members of the access zone (208) and the access zone (206), a weighted priority score could be represented as impact score multiplied by number of impacted members (100*32), or 3200 in this case.

The incoming data may be associated with its weighted priority may be added (436) to a collection, where it may be sorted by weighted priority and stored until processor resources become available to address it. When processor resources are available, the highest priority event may be selected (438) and one or more dynamic access zones may be defined (440) in response to the event. Continuing the previous example, the weighted priority of 3200 for the service cart event may be selected (438) due to its high priority, and the access zone (208) may be split into two dynamic access zones at the location of the service cart. These newly defined (440) dynamic access zones may be processed (442) to determine the friction and desire of the contained members, and then may be discarded (444) when the event data associated with the dynamic access zones is replaced by newly arrived data.

As another example of how efficient configuration of access zones may be achieved, each person within an environment could be assigned to one of several high-level access zones, which can be regularly evaluated for friction to access one or more resources. As new data becomes available that impacts one or more members of those high-level access zones, those impacted may be separated out into new dynamic access zones, following the steps of FIG. 13 or a similar method. In this manner, one hundred passengers may be separated into four different high-level access zones. If data is received indicating that a passenger in an aisle seat of a row leaves their seat, the system may detect that change of environment and create a new dynamic access zone containing the other passengers within that row. When the aisle seat is later filled, this new dynamic access zone may be discarded.

Figure 14:
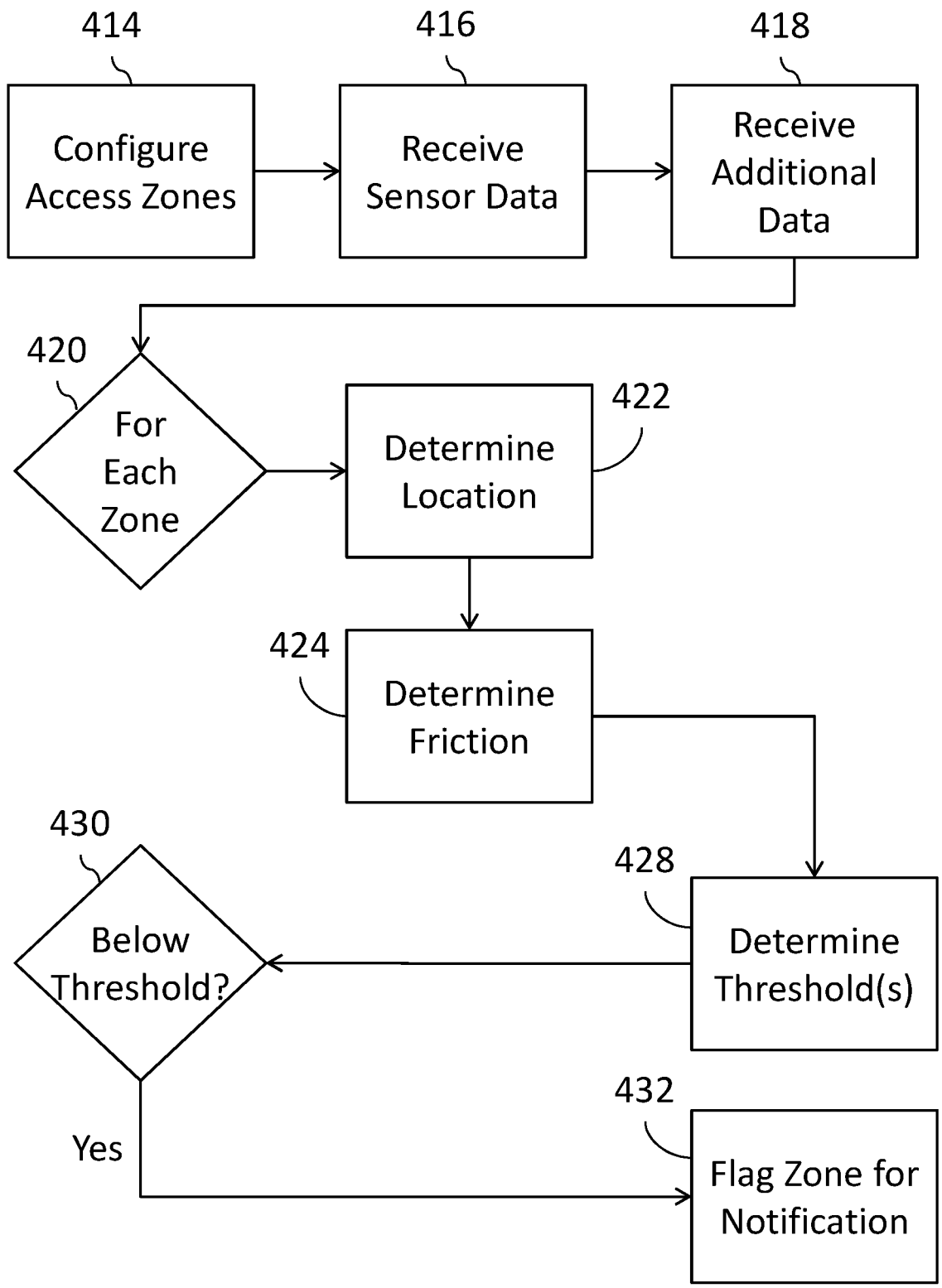
FIG. 14 is a flowchart showing an exemplary set of steps that may performed to determine when an access zone should be notified of resource availability.

Turning now to FIG. 14, that figure shows a flowchart of exemplary steps that may be performed to determine when members of an access zone should be notified of resource availability. One or more access zones may be configured (414), which could include statically configured access zones, dynamically configured access zones, or both. As the environment changes due to resource utilization, and movement of objects and people, sensor data may be received (416) from the sensors (126), and additional data may be received (418) from an airplane messaging system that may impact one or more access zones. As new data becomes available, the server (124) will continually determine the impact of that data on each zone. The zones may be processed in sequence, or in parallel, as may be desirable for a particular implementation of the server (124).

Figure 15:
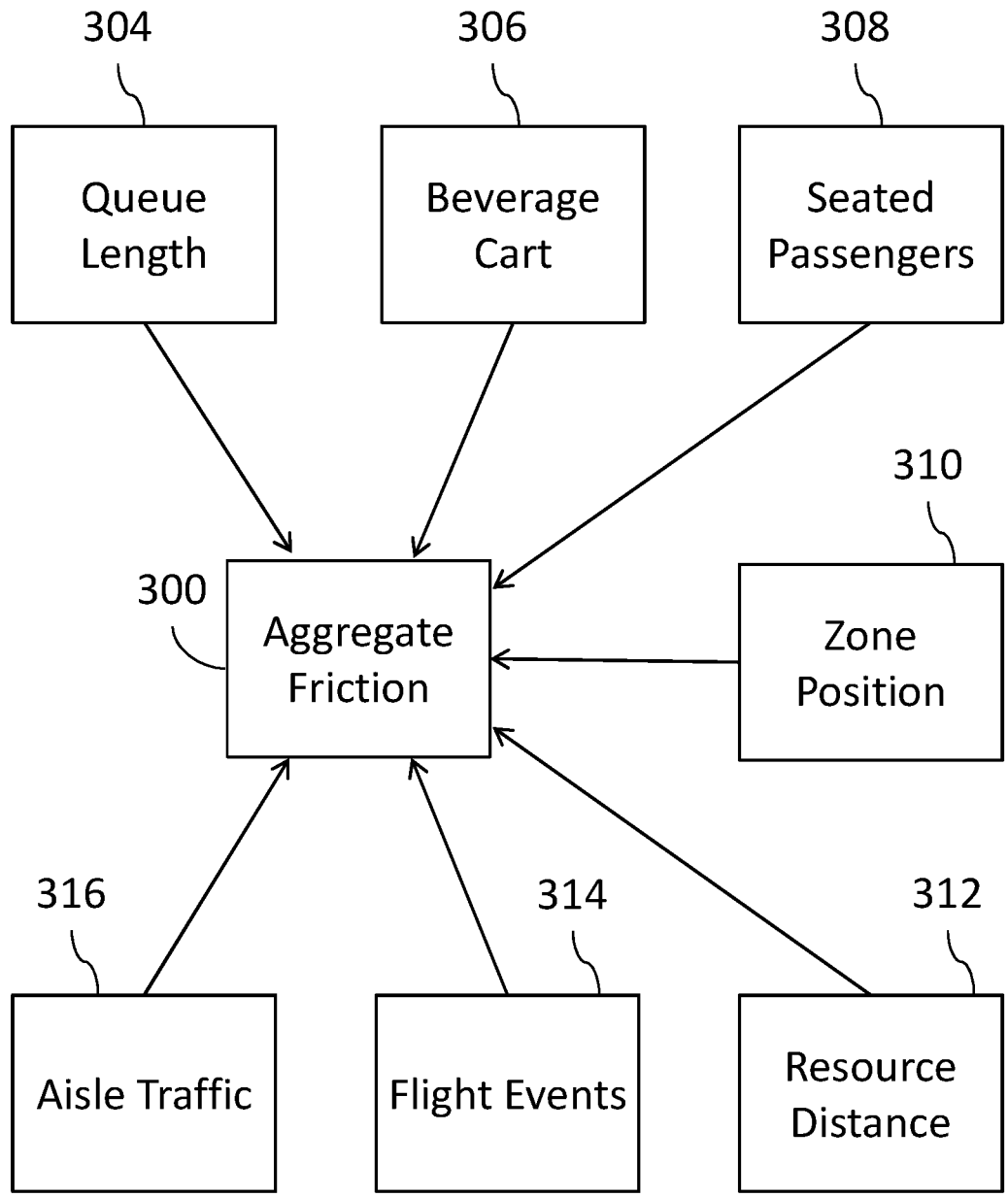
FIG. 15 is a diagram showing an exemplary set of characteristics that may be used to determine access friction.

For each zone (420), a location for the zone may be determined (422) within the environment. This location could be statically configured by a user when access zones are first configured, could be determined as the midpoint of the area of the zone, or could be determined as the midpoint of a travel area adjacent to the zone (e.g., the midpoint of the aisle (110) for the access zone (202)). This starting location may be useful in determining the distance from the access zone to a particular resource, which could influence friction, desire, or both. Total friction for an access zone may also be determined (424) by selecting each piece of available data that positively or negatively impacts friction and totaling them together. FIG. 15 shows a number of exemplary data points or characteristics that may be determined from sensors (126) or other sources and used to determine (424) an aggregate friction (300) for an access zone. The shown characteristics include queue length, which could include an estimated or actual number of persons already waiting at a particular resource, with such data being gathered from a sensor such as the utilization sensor (133), one or more seat sensors (136), or from a device such as the mobile device (122) being carried by one or more queued passengers, for example.

Other factors could include: the current or future presence of a service cart (306), with the current or future location of the service cart being determined by one or more aisle sensors (134); numbers or locations of seated passengers (308), which could be determined by one or more seat sensors (136); the position of the access zone relative to a traversable area like the aisle (110); the distance (312) between the access zone's location and one or more resources in question; one or more flight events (314) that are currently occurring or will soon occur, which could be determined based upon information from a flight messaging system, and which could include fashion seatbelt warnings, turbulence warnings, imminent takeoff or departure, or other similar events; and aisle traffic (316), which could be determined based upon aisle sensors (134), seat sensors (136) or both. The above factors that are described as negatively or positively impacting aggregate friction (300) are exemplary only, and additional factors will be apparent to one of ordinary skill in the art in light of this disclosure.

Additionally, in various implementations some of the described factors influencing friction may be treated as factors influencing desire instead, or in addition to, factors influencing friction.

Each characteristic that influences friction will be associated with a value for that characteristic that is either statically assigned (e.g., the presence of a service cart between a passenger and a resource may be +100 friction, while an aisle passenger being out of their seat may be −10) or determined based upon magnitude (e.g., +1 for each passenger that is detected as being out of their seat). By adding the friction values the aggregate friction (300) may be determined.

Figure 16:
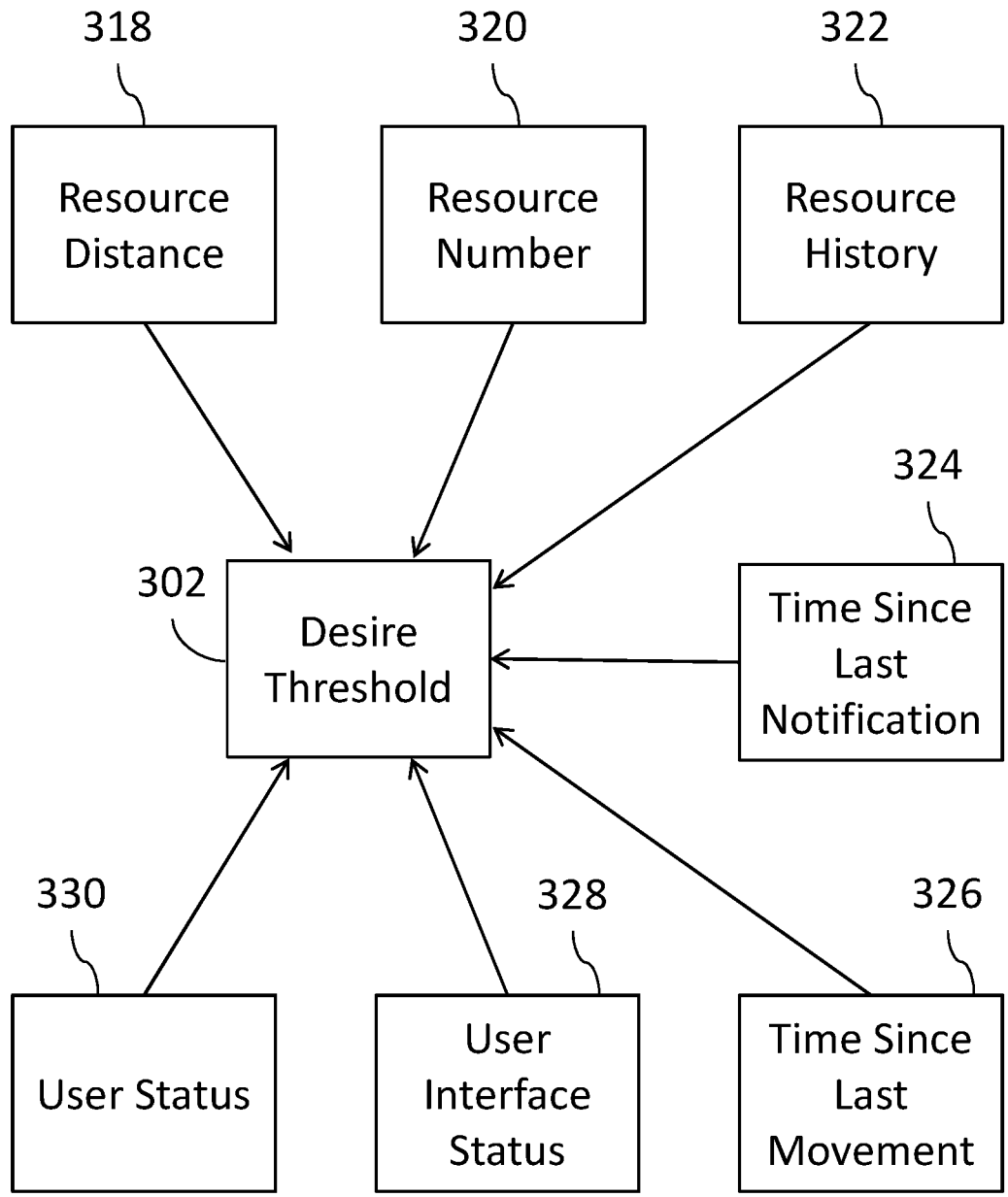
FIG. 16 is a diagram showing an exemplary set of characteristics that may be used to determine an access friction threshold.

Thresholds may also be determined (428) for each access zone by determining the desire that members of the access zone may have to access a resource at that moment. FIG. 16 shows a number of characteristics that may contribute to this desire threshold (302). These factors could include: the distance (318) between the access zone's location and one or more resources in question, as a person may prefer to travel to the closest resource; the total number of resources (320) available within the environment, as a person may prefer to travel to the most readily available resource; the history of resources utilization (322) during a particular flight or other discrete period, as a person may find accessing a resource immediately more desirable if it has been heavily used recently; the time since that access zone last received a notification (324) of resource availability, as a person will have been more likely to be holding off for a future time; the time since a person in that access zone last left their seat (326), as a person seeing another person leave their seat in the past might influence their own desire to leave their seat; and the status of a user interface (328) or other device, such as the interface (114) or the mobile device (122), as a person that is currently watching a movie, making a call, consuming other media, or otherwise using a device may have a low desire to access a resource immediately.

This information could also include a user status (330) which may include information from flight records or other profile information supplied by a particular passenger via a device such as the mobile device (122) which may impact that passengers desire to access a resource at any given time. This could include, for example, whether it can be determined that the passenger is traveling with a child and may like to access the resource frequently, whether the passenger has impaired mobility and may only wish to access the resource in the most convenient circumstances possible, whether the passenger may require assistance in traveling to and from the resource and may need a flight attendant before accessing the resource, or another personal preference provided by the passenger indicating their general desire to access a resource at any given time. As with the aggregate friction (300), the various characteristics that may influence the desire threshold (302) may be given a static value or a value based upon their magnitude and totaled.

Having determined (424) both aggregate friction (300) and determined (428) the desire threshold (302) for an access zone to access a resource at a given time, the system will then determine (430) if the aggregate friction (300) falls below the desire threshold (302). Where aggregate friction (300) is above the desire threshold (302), it indicates that, after having considered all available characteristics, the difficulty of accessing the resource currently exceeds the access zone's desire to access the resource, and so it would be an inconvenient time to access the resource.

Where aggregate friction (300) does fall below the desire threshold (302), it indicates that, after having considered all available characteristics, the difficulty of accessing the resource is currently exceeded by that access zone's desire to access the resource and it would be a convenient time to access the resource. In this case, the access zone will be flagged (432) for notification to proceed to the resources and use it. The next time the system sends (412) notifications to one or more persons to access a resource may include some or all of the flagged persons, with notifications being delivered via the interface (114) or the mobile device (122) as has already been described.

While described largely within the context of enabling access to restrooms with an airplane, it should be understood that the principles, systems, and methods described herein are applicable to a variety of settings and contexts (e.g., waiting rooms, sports venues, etc.). It should also be understood that implementation of one or more of the systems and methods described herein does not require a fixed or permanent structure such as a building or airplane. For example, the disclosed technology could be implemented to manage access to one or more temporarily installed restrooms at an outdoor fair, outdoor concert, or other outdoor event. Sensors (126) and information used to enable access in such an implementation could include self-reporting from a plurality of mobile devices (122) possessed by attendees of the event that could be used to determine crowd size and location across an area (in relation to temporary restrooms), infrared or other imaging devices installed on temporary structures or mounted on aerial drones that could determine crowd size and position, occupancy sensors and counters installed on temporary restrooms, flow counters installed on gates and other chokepoints, and other information that could be used to determine the general size, position, and flow of a large crowd across a large area. Such information could be used to pro-actively promote equal distribution of attendees to restrooms or other resources (e.g., food and beverage vendors) across the entirety of the large area. Other variations and examples exist and will be apparent to one of ordinary skill in the art in light of this disclosure.

While some implementations may simply notify persons as they are flagged, this may not be an ideal approach as providing bulk notifications to multiple members of a large access zone could cause a higher volume of members to proceed to the resource than desired and trigger bottlenecking at the resource. Thus, there may be limitations placed on notification such that a small number of members are randomly or sequentially chosen from an access zone to receive notifications of availability and, if those are ignored based upon feedback from seat sensors (136) or utilization sensors (133), another small batch of randomly selected members may be notified. Additionally, any individual person within an environment might be limited to receiving one notification per hour, to prevent repeated unwanted notifications of availability.

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

EXAMPLE 1

A system for enabling access to resources comprising: (a) a resource server; (b) a set of user devices in communication with the resource server; and (c) a set of sensors in communication with the resource server, wherein the sensors are adapted to be positioned within an environment having a resource; wherein the resource server is configured to: (i) identify one or more access zones within the environment, wherein each access zone of the one more access zones: (A) indicates an area within the environment, (B) is associated with a subset of the set of user devices, (ii) receive a set of resource data and a set of environment data from the set of sensors, wherein the set of resource data indicates a resource status of the resource and the set of environment data indicates an environment status of the environment, (iii) for each access zone of the one or more access zones, determine an access friction based at least upon the resource status and the environment status, (iv) for each access zone of the one or more access zones, determine an access threshold; and (v) where the access friction for any access zone does not exceed the access threshold for that access zone, provide an indication of resource availability to one or more user devices of the set of user devices that are within that access zone.

EXAMPLE 2

The system of Example 1, wherein the set of sensors comprises a resource availability sensor configured to indicate whether the resource is in use and a resource path sensor configured to indicate whether a path between the resource and the access zone is obstructed.

EXAMPLE 3

The system of Example 2, wherein the resource availability sensor is an occupancy sensor, the resource is a restroom, and the resource status comprises whether the restroom is available or not, and wherein the resource path is a walkway leading to the restroom.

EXAMPLE 4

The system of any one or more of Examples 1-3, wherein the access friction for each access zone indicates a level of difficulty associated with accessing the resource from that access zone.

EXAMPLE 5

The system of Example 4, wherein the environment status comprises whether a path between the resource and the access zone is obstructed, wherein the access friction is determined based at least upon a location of the access zone relative to the resource and whether the path is obstructed.

EXAMPLE 6

The system of any one or more of Examples 1-5, wherein the access threshold for each access zone indicates a level of desire that any person within that access zone has to access the resource.

EXAMPLE 7

The system of Example 6, wherein the access threshold is a pre-configured threshold.

EXAMPLE 8

The system of Example 6, wherein each access zone of the one more access zones comprises a set of access zone characteristics, wherein the access threshold for an access zone is determined based at least upon the environment status and the set of access zone characteristics for that access zone.

EXAMPLE 9

The system of Example 8, wherein the set of access zone characteristics comprises a duration of time since that access zone received a prior indication of resource availability, and the environment status comprises a resource usage history during the duration of time that access zone received the prior indication of resource availability.

EXAMPLE 10

The system of any one or more of Examples 1-9, wherein each access zone indicates two or more seats within the area, and wherein each access zone is configured to indicate the two or more seats based upon a commonality of the two or more seats.

EXAMPLE 11

The system of Example 10, wherein the commonality of the two or more seats is one or more of: (a) a position of each seat relative to the resource, (b) a position of each seat relative to a path between that access zone and the resource, and (c) the presence of an obstruction in the path between that access zone and the resource.

EXAMPLE 12

The system of any one or more of Examples 1-11, wherein each access zone indicates a single seat within the area.

EXAMPLE 13

The system of any one or more of Examples 1-12, wherein the set of user devices comprises one or more of: (a) a smartphone; (b) a seatback device; and (c) an armrest device.

EXAMPLE 14

The system of Example 13, wherein the smartphone is configured to act as a sensor of the set of sensors.

EXAMPLE 15

A method comprising the steps: (a) identifying one or more access zones within an environment, (b) receiving a set of resource data and a set of environment data from a set of sensors within the environment, (c) determining a resource status based upon the set of resource data and an environment status based upon the set of environment data, (d) for each access zone of the one or more access zones, determining an access friction for a person within that access zone to access a resource within the environment, (e) for each access zone of the one or more access zones, determining an access threshold, and (f) where the access friction for any access zone does not exceed the access threshold for that access zone, providing an indication of resource availability to one or more user devices within that access zone.

EXAMPLE 16

The method of Example 15, further comprising the step of determining the access friction based at least upon the resources status and the environment status.

EXAMPLE 17

The method of Example 16, wherein the resources status comprises an indicator of availability for the resource from an occupancy sensor of the set of sensors and the environment status comprises a path obstruction indicator from a proximity sensor of the set of sensors, wherein the occupancy sensor is positioned proximate to the resource, and the proximity sensor is positioned proximate to a path between the access zone to the resource.

EXAMPLE 18

The method of Example 17, wherein the environment is an airplane, the resource is a restroom, and the path is an aisleway giving one or more seats within an access zone access to the restroom.

EXAMPLE 19

A system for enabling access to resources comprising a resource server configured to: (i) identify one or more access zones within an environment, wherein each access zone of the one more access zones: (A) indicates an area within the environment, (B) is associated with a set of user devices, (ii) receive a set of resource data and a set of environment data from a set of sensors within the environment, wherein the set of resource data indicates a resource status of the resource and the set of environment data indicates an environment status of the environment, (iii) for each access zone of the one or more access zones, determine an access friction based at least upon the resource status and the environment status, and (iv) for each access zone of the one or more access zones, determine an access threshold; (v) where the access friction for any access zone does not exceed the access threshold for that access zone, provide an indication of resource availability to the set of user devices associated with that access zone.

EXAMPLE 20

The system of Example 19, wherein: (a) the environment is an airplane and the resource is a restroom, (b) the set of user devices comprises one or more of a smartphone and a seatback device, (c) the resource status comprises an availability indication, and (d) the environment status comprises a path obstruction indication associated with an aisleway in between that access zone and the restroom.

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

The invention claimed is:
1. A system for enabling access to resources comprising:
(a) a server;
(b) a set of user devices in communication with the server; and
(c) a set of sensors in communication with the server, wherein the sensors are positioned within a cabin of an airplane and configured to provide information associated with a plurality of resources within the airplane;
wherein the server is configured to:
(i) receive a set of sensor data from the set of sensors, the set of sensor data comprising a set of resource data and a set of environment data, wherein:
(A) the set of resource data indicates a resource status for each of the plurality of resources, and
(B) the set of environment data indicates an environment status of areas of the cabin proximate to one or more of the plurality of resources,
(ii) for each of the plurality of resources, determine an availability for that resource that indicates a level of difficulty associated with accessing that resource, and a user demand for that resource that indicates a level of desire, of an average person in the cabin, to access and use that resource, based on the set of sensor data,
wherein the server is further configured to:
(A) determine, as part of the availability for that resource, whether a cabin area proximate to that resource is obstructed based on the environment status for the cabin area, and
(B) determine, as part of the user demand for that resource, an access history for that resource based on the resource status for that resource, wherein the access history describes a frequency of utilization over a preceding time period,
(iii) in response to a request associated with a resource of the plurality of resources from a first user device of the set of user devices, provide an indication of the availability and the user demand for the resource to the first user device, and

(iv) based on the availability and the user demand, and independent of any request associated with the resource received from a second user device of the set of user devices, provide an indication of resource availability to the second user device.

2. The system of claim 1, wherein the set of sensors comprises a first utilization sensor configured to indicate whether the resource is in use by a person and a second utilization sensor configured to indicate whether any other persons are waiting at the resource.

3. The system of claim 2, wherein the resource is a restroom, the first utilization sensor comprises an occupancy sensor configured to detect the person within the restroom, and the second utilization sensor comprises an imaging device configured to capture images of the area proximate to the restroom.

4. The system of claim 2, wherein the resource is a restroom, the first utilization sensor comprises a latch sensor configured to detect whether a door of the restroom has been locked, and the second utilization sensor comprises an imaging device configured to capture images of the area proximate to the restroom.

5. The system of claim 2, wherein the server is configured to receive an occupancy signal from the first utilization sensor and, in response, activate an external indicator associated with the restroom to provide an indication that the resource is in use.

6. The system of claim 1, wherein the set of user devices comprises one or more of:
(i) a smartphone,
(ii) a seatback device, and
(iii) an armrest device.

7. The system of claim 6, wherein the smartphone is configured to act as a sensor of the set of sensors.

8. The system of claim 1, wherein the set of sensors comprises a set of seat sensors positioned in each of a plurality of seats within the cabin, and wherein the server is further configured to receive a set of seat sensor data as part of the set of sensor data, wherein the set of seat sensor data describes characteristics of the plurality of seats.

9. The system of claim 8, wherein the server is further configured to determine whether each of the plurality of seats is occupied based on the set of seat sensor data.

10. The system of claim 8, wherein the set of seat sensors comprises a set of seat position sensors, and wherein the server is further configured to determine a seat position for each of the plurality of seats based on the set of seat sensor data from the set of seat position sensors.

11. The system of claim 8, wherein the server is further configured to determine whether the set of seat sensor data indicates, for each of the plurality of seats, whether an occupant of that seat is sleeping.

12. The system of claim 1, wherein the set of sensors comprises a cart sensor positioned in each of a plurality of service carts, and wherein the server is further configured to:
(i) receive a set of cart sensor data as part of the set of sensor data, and
(ii) determine a status for each of the plurality of service carts based on the set of cart sensor data.

13. The system of claim 12, wherein the status for each of the plurality of service carts comprises a position for that service cart within the cabin.

14. The system of claim 1, wherein the set of user devices comprise a set of seatback media devices, and wherein the server is further configured to:
(i) receive a set of media data from the set of seatback media devices, and
(ii) determine a use status for each of the set of seatback media devices, wherein the use status describes content that is being viewed on each of the set of seatback media devices.

15. A method for managing access to resources comprising:
(a) at a server, receiving a set of sensor data from a set of sensors positioned within a cabin of an airplane and configured to provide information associated with a plurality of resources within the airplane, the set of sensor data comprising a set of resource data and a set of environment data, wherein:
(i) the set of resource data indicates a resource status for each of the plurality of resources, and
(ii) the set of environment data indicates an environment status of areas of the cabin proximate to one or more of the plurality of resources;
(b) for each of the plurality of resources, determining an availability for that resource that indicates a level of difficulty associated with accessing that resource, and a user demand for that resource that indicates a level of desire, of an average person in the cabin, to access and use that resource, based on the set of sensor data, further comprising:
(i) determining, as part of the availability for that resource, whether a cabin area proximate to that resource is obstructed based on the environment status for the cabin area, and
(ii) determining, as part of the user demand for that resource, an access history for that resource based on the resource status for that resource, wherein the access history describes a frequency of utilization over a preceding time period,
(c) in response to a request associated with a resource of the plurality of resources from a first user device of a set of user devices in communication with the server, providing an indication of the availability and the user demand for the resource to the first user device, and
(d) based on the availability and the user demand, and independent of any request associated with the resource received from a second user device of the set of user devices, providing an indication of resource availability to the second user device.

16. The method of claim 15, wherein the resource is a restroom, the method further comprising:
(a) receiving a set of occupancy data from an occupancy sensor of the set of sensors, wherein the occupancy sensor is configured to detect a person within the restroom,
(b) determining the availability for the resource based on the set of occupancy data,
(c) receiving a set of images from an imaging device of the set of sensors, wherein the imaging device is configured to capture images of the area proximate to the restroom, and
(d) determining the user demand for the restroom based on the set of images.

* * * * *